United States Patent [19]

DuCharme, Jr.

[11] Patent Number: 5,942,167
[45] Date of Patent: Aug. 24, 1999

[54] METHOD OF MAKING A CELLULOSE FOOD CASING INCLUDING SOLVENT RECOVERY

[75] Inventor: Paul Edmund DuCharme, Jr., Tinley Park, Ill.

[73] Assignee: Viskase Corporation, Chicago, Ill.

[21] Appl. No.: 08/909,943

[22] Filed: Aug. 12, 1997

[51] Int. Cl.$^6$ .................................................. B29C 47/94
[52] U.S. Cl. ..................... 264/37.2; 264/37.26; 264/179; 264/211.13; 264/211.19; 264/559
[58] Field of Search ............................. 264/37.2, 37.26, 264/559–562, 565, 569, 179, 183, 186, 187, 188, 203, 211.13, 211.19

[56] References Cited

U.S. PATENT DOCUMENTS

| | | | |
|---|---|---|---|
| 2,179,181 | 11/1939 | Graenacher et al. | 106/200.3 |
| 4,145,532 | 3/1979 | Franks et al. | 536/56 |
| 4,426,228 | 1/1984 | Brandner et al. | 106/203.3 |
| 5,094,690 | 3/1992 | Zikeli et al. | 106/200.2 |
| 5,277,857 | 1/1994 | Nicholson et al. | 264/187 |
| 5,358,765 | 10/1994 | Markulin | 428/34.8 |
| 5,451,364 | 9/1995 | DuCharme, Jr. et al. | 264/559 |
| 5,628,941 | 5/1997 | Kalt et al. | 264/38 |
| 5,653,931 | 8/1997 | Eibl et al. | 264/187 |

FOREIGN PATENT DOCUMENTS

| | | |
|---|---|---|
| 1171615 | 7/1984 | Canada . |
| 756 825 | 2/1996 | European Pat. Off. . |
| 2 464 651 | 3/1981 | France . |
| 44 21 482 | 12/1991 | Germany . |
| WO 93/11287 | 6/1993 | WIPO . |

OTHER PUBLICATIONS

Encyclopedia of Polymer Science & Engineering, vol. 6, pp. 252–253, John Wiley & Sons, 1987.

Ullmann's Encyclopedia of Industrial Chemistry, vol. A14, pp. 428–429, 1994.

Union Carbide Chemicals and Plastics Company Inc., *Polyox Water–Soluble Resins*, 1988.

*Primary Examiner*—Jan H. Silbaugh
*Assistant Examiner*—Mark Eashoo
*Attorney, Agent, or Firm*—Roger Aceto

[57] ABSTRACT

Disclosed is a method of extruding a solution of cellulose and an amine oxide cellulose solvent as a tube about a sizing mandrel which diametrically stretches the extruded tube. An aqueous poly(ethylene oxide) solution is introduced into the interior of the extruded tube to facilitate passage of the tube over the sizing mandrel and to extract the amine oxide cellulose solvent from the tube. After such extraction, the aqueous poly(ethylene oxide) solution containing the extracted amine oxide cellulose solvent is contacted with an anion exchanger to remove the poly(ethylene oxide) so the amine oxide cellulose solvent can be recovered.

10 Claims, 2 Drawing Sheets

METHOD OF MAKING A CELLULOSE FOOD CASING INCLUDING SOLVENT RECOVERY

TECHNICAL FIELD

The present invention relates to a method of forming a cellulose tube, suitable for use as a food casing, using a solution of nonderivatized cellulose, a tertiary amine oxide cellulose solvent and water.

BACKGROUND OF THE INVENTION

The manufacture of seamless cellulose tubes for sausage casings using cellulose derived by the so-called "viscose process" is well known in the art. Briefly, in the viscose process, a natural cellulose such as cotton linters or wood pulp is reacted chemically to form a cellulose derivative (cellulose xanthate) which is soluble in a weak caustic solution. The solution or "viscose" is extruded as a tube into an acid bath. The extruded viscose reacts chemically with the acid bath resulting in the regeneration and coagulation of a pure cellulose tube. The chemical reaction produces several by-products including hydrogen sulfide and carbon disulfide.

More recently, a process of direct cellulose dissolution has been adapted to the manufacture of cellulose food casings. In this process no cellulose derivative is formed so the chemical reactions required first to form a cellulose derivative and then to regenerate the cellulose from the derivative have been eliminated. Instead, a natural cellulose is put directly into solution with the use of a tertiary amine oxide cellulose solvent such as N-methyl-morpholine-N-oxide (NMMO). The resulting solution is thermoplastic in that it hardens upon cooling and flows on reheating. The solution, when molten, can be extruded into a water bath. The NMMO solvent is extracted in the water bath so that a regeneration of the cellulose solution occurs. Use of NMMO as a solvent for cellulose eliminates the need for derivatizing the cellulose, as in the viscose process. This avoids certain disadvantages of the viscose process such as the generation of gaseous sulfur compounds during the regeneration process.

U.S. Pat. Nos. 2,179,181; 4,145,532; 4,426,228 and Canadian Pat. No. 1,171,615 all deal with the formation of a cellulose solution using the NMMO solvent and subsequent formation of cellulose articles such as films and filaments using the resulting solution. An apparatus and method for preparing an extrudable cellulose solution in a continuous process are disclosed in U.S. Pat. Nos. 5,094,690 and 5,330,567. In these patents, a suspension of cellulose in an aqueous solution of NMMO is fed into the top of a vessel having a heated wall. Within the vessel, a rotating wiper spreads the suspension across the heated wall and moves the suspension downward in the vessel. As the suspension moves downward, water is evaporated and the concentration of NMMO increases. Eventually, the temperature of the suspension and the concentration of NMMO reaches a level where the cellulose is dissolved so that a cellulose solution flows from the bottom of the vessel.

U.S. Pat. Nos. 5,277,857; 5,451,364 and 5,597,587 disclose a tubular extrusion method and apparatus utilizing the thermoplastic cellulose solution for purposes of making tubular films. Such films, for example, may be used as sausage casings.

As disclosed in these patents, the cellulose solution is extruded through an annular die and into a bath of nonsolvent liquid. This can be, for example, water but a nonsolvent concentration of water and NMMO is preferred. This is because one advantage of this direct cellulose dissolution method for producing a cellulose film is that the solvent is recoverable and can be reused. This adds to the economy of the method in that the solvent extracted during cellulose regeneration can be recycled into the system to dissolve the natural cellulose for extrusion. Thus, while water alone is preferred from the standpoint of the speed of cellulose regeneration, an initial higher concentration of NMMO in the bath renders the recovery of the solvent for reuse more cost effective. For example, a regenerating bath having an initial concentration of at least 10% wt. NMMO is considered cost effective for solvent recovery with a range of 15–50% wt. being preferred.

A method for recovering the NMMO is disclosed in WO 93/11287. Briefly the method involves a step of purifying the bath liquid (water+NMMO) by treatment with a strongly basic anion-exchange resin wherein the resin is regenerated by successive treatments with an aqueous solution of a strong inorganic acid and an aqueous solution of sodium hydroxide.

For purposes of forming tubular films as disclosed in the above referenced patents, the extrusion occurs about a mandrel which depends from the die. An accommodation is made for the introduction of liquid from the regenerating bath into the volume inside the extruded tube. This introduction of the regenerating liquid into the interior of the extruded tube is said to perform several functions. These include, for example, lubrication of the mandrel to facilitate passage of the extruded tube and initiation of the regeneration of cellulose at the inner surface of the extruded tube.

For purposes of size control of the extruded tube, it is preferred that the mandrel have a section which is larger in diameter than the extruded tube so that the tube is diametrically expanded as it passes over the mandrel. However it has been found that when the mandrel diameter is larger than the extruded tube diameter, water alone is not a sufficient lubricant.

Introducing a lubricant such as an oil or the like into the interior of the extruded tube was not attempted because this would add a third component (the lubricant) which would complicate the recovery of the NMMO.

Accordingly, a solution of water and NMMO has been preferred for introduction into the extruded tube. The solution for such introduction can be drawn directly from the regenerating bath (the "outer bath") and introduced into the extruded tube through the mandrel as disclosed, for example, in U.S. Pat. No. 5,277,857. To insure that the extruded tube does not bind on the mandrel, a higher minimum concentration of 30% NMMO solvent is useful with a preferred range being 30–50% as disclosed in U.S. Pat. No. 5,451,364. Thus, an operable system can use a 15% NMMO concentration for the outer bath liquid and a 30% NMMO concentration for the liquid introduced into the extruded tube. In subsequent stages of the manufacturing operation these liquids become mixed for extraction and reuse of the solvent.

For process purposes, it is desirable to regenerate the cellulose from the extruded tube as quickly as possible. For example, it is known that a rapid regeneration produces a more dense cellulose structure which in turn enhances the strength of the cellulose film which is produced. This desire for rapid regeneration is offset by the need for introducing more lubricant into the interior of the extruded tube and the desire for efficient solvent recovery. Accordingly, as noted above, an NMMO solution has been used for both liquids instead of water alone. It now has been discovered that the solvent can be eliminated entirely from the liquid introduced into the interior of the extruded tube without sacrificing lubricating properties to prevent binding of the extruded tube to the mandrel. The elimination of solvent has the added advantage that the regeneration of cellulose at the inner surface of the extruded tube is accelerated resulting in a denser cellulose structure and enhanced properties.

It has been found that the addition of a suitable surfactant, preferably a nonionic poly(ethylene oxide) rather than NMMO or other lubricant, will provide sufficient lubricity to prevent binding of the extruded tube to the mandrel. Thus, the surfactant addition eliminates the need for having NMMO solvent in the liquid introduced into the interior of the extruded tube (thereby providing the advantage of speeding regeneration) while providing the necessary lubrication to prevent binding.

The liquid introduced into the interior of the extruded tube eventually is drawn into a volume within the extruded tube below the mandrel. This volume or "inner bath" along with water and surfactant, contains an amount of NMMO solvent extracted from the extruded tube. Liquid removed from the inner bath as disclosed in U.S. Pat. No. 5,277,857 can be mixed with liquid from the outer bath for solvent recovery. The presence of the surfactant in the mixture of the inner and outer baths was found not to interfere with solvent recovery. This is because the bath mixture, prior to solvent recovery, is subjected to an anion exchange column. The anion column which is designed to remove certain by-products of cellulose dissolution and regeneration also removes the nonionic poly(ethylene oxide) surfactant which then is destroyed during the acid regeneration of the column. Thus, it has been found that the use of a nonionic poly(ethylene oxide) surfactant does not introduce a third component that complicates recovery of solvent from the bath.

Accordingly, it is an object of the present invention to provide a process for regenerating a seamless cellulose tube (suitable for use as a sausage casing) from a solution of nonderivatized cellulose, a tertiary amine oxide cellulose solvent and water in which regeneration of the cellulose at the inner surface of the extruded tube is accelerated.

Another object is to provide such a process in which the regeneration of cellulose at the inner surface is accelerated by introducing a solvent-free regenerating liquid into the interior of the extruded tube.

A further object is to provide such a process wherein the extrusion occurs about a mandrel which diametrically expands the extruded tube and the solvent-free regenerating liquid introduced into the interior of the extruded tube is an aqueous solution containing a lubricant to prevent the binding of the extruded tube to the mandrel.

Yet another object is to provide such a process wherein the lubricant which is a component of the regenerating solution does not interfere with the subsequent purification and recovery of NMMO from the regenerating liquids.

SUMMARY OF THE INVENTION

In accordance with the present invention, the starting material is a cellulose solution comprising a natural cellulose which has been subject to a direct dissolution by a solvent comprising an aqueous solution of an amine oxide. Processes for such dissolution using an aqueous solution of N-methyl-morpholine-N-oxide (NMMO) are known in the art and form no part of the present invention. The product of such a dissolution process is an extrudable solution having a melting temperature of about 60–70° C. which is extrudable at a temperature of about 70–105° C. and comprising 10–20 wt. % cellulose, 70–80 wt. % NMMO and 5–15 wt. % water.

The cellulose solution is characterized hereafter as being a nonderivatized cellulose solution. For purposes of this specification, the term "nonderivatized" cellulose means a cellulose which has not been subjected to covalent bonding with a solvent or reagent but which has been dissolved by association with a solvent or reagent through Van der Waals forces and/or hydrogen bonding.

The cellulose solution is extruded through an annular die and about a mandrel which depends from the die. Suitable extrusion methods and apparatus for such extrusion are disclosed in U.S. Pat. Nos. 5,277,857; 5,451,364 and in U.S. Pat. Nos. 5,766,540 and 5,759,478 the disclosures of which are incorporated herein by reference.

Briefly, and as disclosed in the above referenced patents, extrusion from the die is downward through an air gap and into an outer bath of nonsolvent liquid. "Nonsolvent" as used herein means a liquid which is not a cellulose solvent and preferably is water or a nonsolvent concentration of NMMO in water. In the outer bath, the NMMO is extracted from the extruded tube through the tube outer surface thereby coagulating and regenerating the nonderivatized cellulose to form a tube composed of a cellulose gel. The gel tube is washed to remove residual NMMO solvent. Then it is plasticized with a polyol such as glycerine and dried to form a tubular film.

For purposes of size control, the cellulose solution is extruded about a mandrel which diametrically stretches the extruded tube prior to entering the outer bath. The mandrel also is structured to accommodate the introduction of a nonsolvent liquid into the interior of the extruded tube. Non-solvent liquid introduced into the interior of the extruded tube has several functions including the initiation of solvent extraction from the inner surface of the extruded tube and lubrication of the mandrel to prevent the extruded tube from binding to the mandrel surface.

As noted above, water alone is preferred for rapid solvent extraction. However, in some situations, water alone is not a suitable mandrel lubricant. One situation where this is the case where the mandrel diameter is larger relative to the extruded tube diameter for purposes of diametrically sizing the extruded tube. In this case, it has been necessary to add NMMO to the water introduced into the interior of the extruded tube to provide the necessary slip to prevent binding of the extruded tube to the mandrel surface.

For purposes of economy, the NMMO extracted from the extruded tube is recovered for reuse in the dissolution process. For this purpose the regenerating liquids coming in contact with both the inner and outer surfaces of the extruded tube are removed, mixed together and processed to extract the NMMO. It should be appreciated that the presence of a third liquid component (other than water and NMMO) would complicate recovery of the NMMO. It is for this reason that the nonsolvent introduced into the interior of the extruded tube contains NMMO to provide the required "slip" rather than another lubricant such as an oil even though use of NMMO compromises the rate of solvent extraction from the inner surface of the extruded tube.

It now has been found that adding a suitable surfactant such as poly(ethylene oxide) to the nonsolvent introduced into the interior of the extruded tube (instead of NMMO) will provide the required mandrel lubrication without compromising the NMMO extraction characteristics of water alone and without interfering with the subsequent recovery of the NMMO.

A suitable surfactant for purposes of the present invention is one which is removable from the bath liquid by the action of the strongly basic anion-exchange resin as may be used for purifying the NMMO. A preferred surfactant is a nonionic poly(ethylene oxide) referred to herein as PEO. PEO is an olefinic oxide polymer having a molecular weight of at least about 70,000 and up to 5,000,000. It is a free-flowing powder which is soluble in water at temperatures up to 98° C. PEO is commercially available from Union Carbide Corporation under the trademark POLYOX®. POLYOX water soluble resins, CAVES Registry NO. 25 322-68-3 are described as being nonionic water soluble polymers of PEO which are available in a range of molecular weights.

It has been found that the PEO does not compromise the ability of the nonsolvent liquid to extract NMMO from the extruded tube and it provides sufficient lubrication to prevent the extruded tube from binding to the mandrel surface. More important, the PEO does not present problems during the recovery of the NMMO because it is removed by the strongly basic anion-exchange resin used in the purification of the NMMO. Thereafter, the PEO removed by the resin is destroyed and washed from the resin during the regeneration of the resin with an inorganic acid such as HCl.

Accordingly, the present invention is characterized by a method of forming a tubular film by tubular extrusion of a nonderivatized cellulose solution comprising cellulose, NMMO cellulose solvent and water including the steps of introducing into the extruded tube interior, a nonsolvent liquid which is free of NMMO cellulose solvent and which comprises water and a suitable surfactant to extract NMMO solvent from the inner surface of the extruded tube. The nonsolvent then is removed for recovery of the NMMO solvent, the recovery process including contact by an anion exchange resin which removes the surfactant thereby leaving a solution of NMMO and water from which the NMMO is removed for reuse.

In particular the present invention may be characterized by a process for forming a tubular cellulose tube comprising the steps of:

a) forming a thermoplastic solution composed of a non-derivatized cellulose, NMMO and water;

b) extruding the solution through an extrusion die having an annular extrusion orifice to form an extruded tube of the solution;

c) passing the extruded tube over and about a mandrel which depends from the die, the mandrel having a portion which defines a cylindrical surface which is larger in diameter than the extruded tube for contacting and diametrically expanding the extruded tube and thereafter passing the extruded tube into an outer bath comprising water and a concentration of 10 to 30% NMMO;

d) contacting the extruded tube with the outer bath for regenerating the cellulose and forming a hydrated cellulose tube by extracting the NMMO from the extruded tube;

e) introducing a nonsolvent liquid consisting essentially of water and PEO into the interior of the extruded tube, to form a pool within the extruded tube and about the mandrel cylindrical surface, the pool contacting the extruded tube inner surface for initiating the extraction of NMMO from the inner surface of the extruded tube so as to commence the regeneration of cellulose at said inner surface;

f) continuously removing the nonsolvent liquid and extracted NMMO from the pool by drawing between the extruded tube inner surface and the mandrel cylindrical surface and into an inner bath contained inside the hydrated cellulose tube and below the mandrel and said drawing of nonsolvent liquid from the pool providing lubrication of the mandrel cylindrical surface to facilitate passage of the extruded tube over the mandrel cylindrical surface;

g) removing and combining portions of the inner and outer baths to form a mixture of water, NMMO and PEO;

h) removing PEO from the mixture by contacting the mixture with an anion exchange resin so as to provide a PEO-free solution of water and NMMO; and i) evaporating water from the PEO-free solution to provide a higher NMMO concentration and using the higher NMMO concentration in the formation of the thermoplastic solution for the extrusion at step (a).

DETAILED DESCRIPTION OF THE INVENTION

Figure 1:
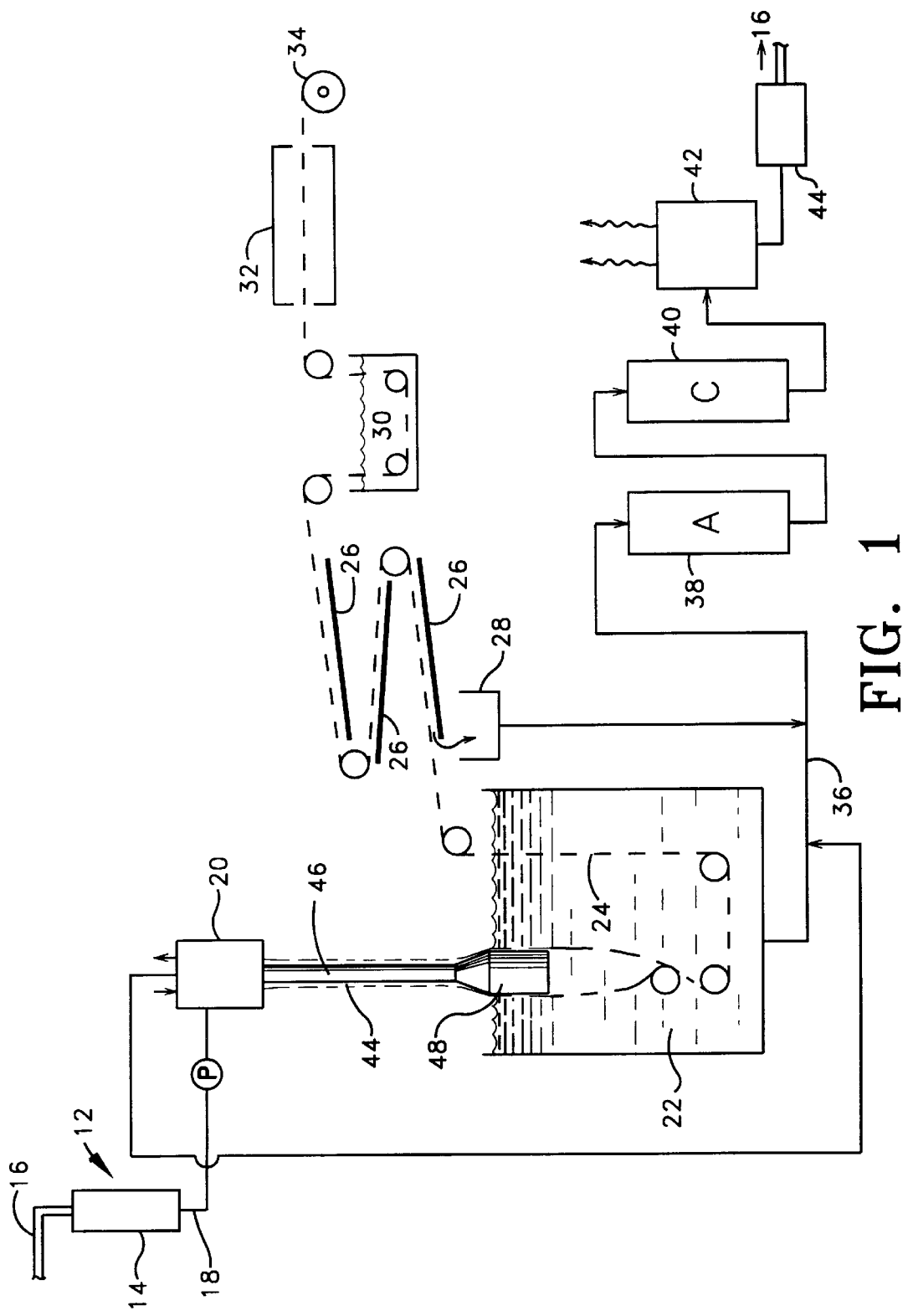
FIG. 1 is a view showing in schematic fashion steps of a process for extruding tubular films and solvent recovery.

Referring to the drawings, FIG. 1 shows a schematic representation of a tubular extrusion system for the production of tubular films of the type as may be used for sausage casings or the like. Briefly, the system includes apparatus generally indicated at 12 for solubilizing a natural cellulose. For example the apparatus can be the type as described in U.S. Pat. Nos. 5,094,690 and 5,330,567 as referred to hereinabove. In this apparatus, a mixture of natural cellulose, water and an amine oxide cellulose solvent such as NMMO is introduced into the top of a heated vessel 14 through an inlet 16. As the mixture moves to the bottom of vessel 14, water is evaporated and a cellulose solution, hereafter referred to as "dope", is forced from a bottom outlet 18. The dope is pumped to an extrusion die 20 arranged for extruding a seamless tube 44 of the dope downwardly into a regenerating bath 22. The regenerating bath 22 contains a nonsolvent liquid. An aqueous solution of 5 to 30% NMMO is preferred. In the bath, the amine solvent is extracted from the extruded tube so as to coagulate and regenerate the cellulose from the solution to form a seamless tube 24 of a hydrated cellulose gel. Accordingly, the NMMO concentration in the bath is enriched as NMMO is extracted from the extruded tube.

The hydrated cellulose tube 24 is transported through a series of wash tubs 26 to remove residual amounts of the amine solvent. The flow through the wash tubs 26 is countercurrent and the amine rich wash water is collected by a drain 28. After washing, the tube is placticized by contact with a glycerine solution 30 and then is dried by passing through a drier 32 to form the cellulose tubular film which is gathered onto a reel 34.

For purposes of economy, amine rich portions of the regenerating bath 22 and wash water from drain 28 are collected and mixed together as in a flow line 36. This mixture is fed through successive anion and cation exchangers 38, 40 respectively to remove ions which may have been generated during the dope making, extrusion and cellulose regenerating processes. The purified mixture then is fed to a heat exchanger 42 to evaporate water and concentrate the amine oxide cellulose solvent (NMMO). The recovered concentrated cellulose solvent then is fed back to the system for purposes of solubilizing the cellulose and making the dope to be extruded. For example, the recovered solvent can be fed to a mixer 44 where it is mixed with a natural cellulose pulp and water to form a suspension which is fed through inlet 16 to the vessel 14.

As part of the extrusion process, the extruded tube 44 of the cellulose solution is passed over a mandrel 46 which depends from the extrusion die. A lower portion 48 of the mandrel has a diameter larger than the extruded diameter of the dope tube. Accordingly, the extruded tube is diametrically expanded as it passes over the cylindrical surface defined by the diameter of the mandrel lower portion 48. As disclosed in U.S. Pat. Nos. 5,277,857 and 5,451,364, it is preferred to introduce a nonsolvent into the extruded tube to initiate the regeneration of the cellulose at the inner surface of the extruded tube and provide the necessary lubrication to prevent binding of the extruded tube to the mandrel. In accordance with the method of the present invention, the nonsolvent so introduced comprises a mixture of poly (ethylene oxide) and water.

Figure 2:
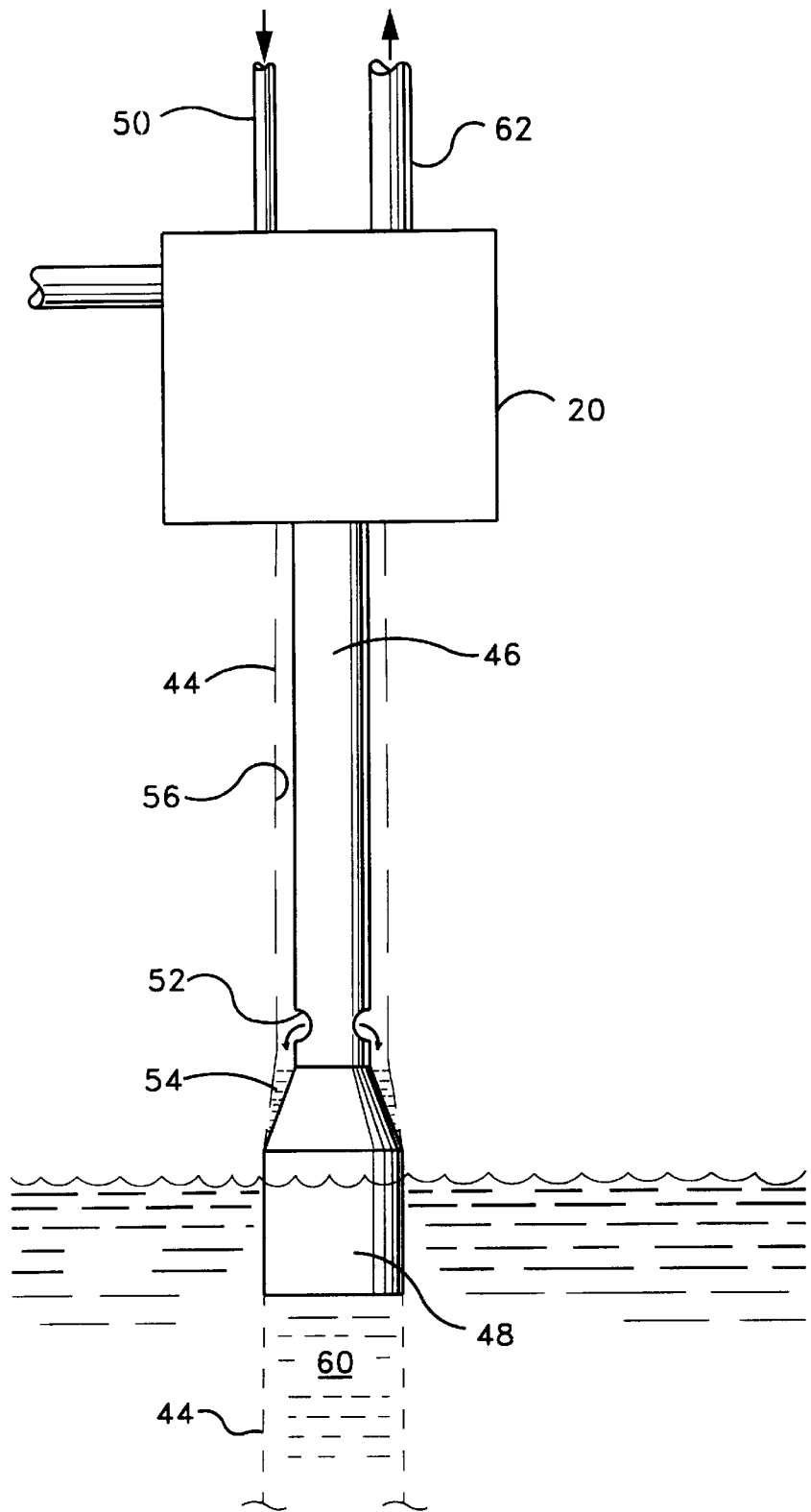
FIG. 2 is a view showing a portion of the tubular extrusion apparatus.

Reference is made to U.S. Pat. Nos. 5,277,857 and Ser. No. 08/827,130 for a detailed description regarding the apparatus and method for introducing nonsolvent into the extruded tube. Briefly, and as shown in FIG. 2, the mandrel 46 is provided with internal inlet and outlet conduits 50 and 62 respectively.

Inlet conduit 50 communicates with an outlet 52 just above the enlarged lower portion 48. Nonsolvent which is introduced through the mandrel forms a pool 54 bounded by the cylindrical surface of the mandrel and the inner surface 56 of the extruded tube 44.

As the extruded tube passes through the pool 54, nonsolvent from the pool is drawn down between the mandrel and the extruded tube and into an inner bath 60 below the mandrel and within the extruded tube 44.

Outlet conduit 62 which also extends through the mandrel has an opening (not shown) communicating with the inner bath 60 so that a portion of the liquid from the inner bath can be removed by suction up through the mandrel. The removed portion of the inner bath liquid then is mixed with removed portions of the outer bath 22 and collected wash water from drain 28 as in the drain line 36 for purposes of recovering the NMMO solvent extracted from the inner surface of the extruded tube.

The volume of liquid introduced into the extruded tube and carried over into the inner bath 60 is extremely small as compared to the volume of liquid in the regeneration outer bath 22 or volume of liquid collected at drain 28. However the liquid introduced into the extruded tube is extremely important in that without it and the pool 54, it would be difficult, if not impossible to draw the extruded tube over the enlarged portion 48 of the mandrel.

As noted above, the nonsolvent introduced into the extruded tube to form pool 54 usually was one containing 30 to 50% of the cellulose solvent NMMO. In this range, the NMMO provided sufficient lubricity to permit passage of the extruded tube over the enlarged portion of the mandrel. In order to test the lubrication provided by various NMMO concentrations, solutions of 15%, 30% and 50% NMMO were tested for surface tension. A fourth solution comprising 1.6 gm of PEO in 14,515 gm of city soft water (a 0.01% solution) also was tested. The PEO was POLYOX® N-750 obtained from Union Carbide Corporation. POLYOX N-750 is said to be a nonionic PEO having an approximate molecular weight of 300,000. The results are noted in Table 1.

TABLE I

| Sample | Surface Tension dynes/cm |
| --- | --- |
| 15% NMMO | 58.74 |
| 30% NMMO | 56.07 |
| 50% NMMO | 54.75 |
| 0.01% POLYOX | 52.51 |

From Table I, it is apparent that even a minor amount of the PEO lowers the water surface tension to a value even below a solution of 50% NMMO.

It has been found that the surface tension provided by a 30% and preferably a 40% NMMO solution generally is needed in the pool 54 for an efficient start up of the extrusion process. This concentration facilitates the initial drawing of the leading end of the extruded tube over the enlarged mandrel portion. As extrusion teaches a steady state condition, this concentration may be dropped to about 20%. This lower NMMO concentration allows for faster regeneration of the cellulose at the inner surface of the extruded tube. As noted above, a faster regeneration is believed to densify the regenerated cellulose structure and enhance various properties of the resulting film. Going to a still lower NMMO concentration in pool 54 tends to destabilize steady state extrusion due to binding of the extruded tube to the mandrel surface.

However, in contrast to the above, the use of PEO in accordance with the present invention provides several advantages. First, it provides a low surface tension in the pool 54 to facilitate a start-up of the extrusion as evidenced by the results of the surface tension comparison as shown in table I. Secondly, it does not interfere with steady-state extrusion conditions after start-up and provides the benefit of initially contacting the extruded tube inner surface with an all water regenerating bath. And, thirdly, it does not interfere with recovery of the NMMO solvent In a test of the invention, dope is extruded at a rate of about 151 g/min (20 lb/hr) from a die orifice 19.05 mm (0.75 in.) in diameter having a die gap of 0.76 mm (0.030 in.). The extrusion is about a mandrel having a lower diameter enlarged to about 27.9 mm (1.1 in.) for purposes of diametrically expanding the extruded tube.

The nonsolvent introduced into the interior of the extruded tube is a 0.01% POLYOX® N-750 solution, as noted above. Start-up is accomplished without difficulty and extrusion is able to continue under steady state conditions for forming a seamless cellulose tubular film. This demonstrates that the PEO is able to provide the slip qualities necessary to allow start-up and continuous operation of the extrusion process.

Thereafter, in accordance with the present invention, liquids from the outer regenerating bath, the wash tanks and the inner bath are recovered and mixed. The mixture is fed to the NMMO purifying and recovery apparatus of the type disclosed in WO 93/11287.

During the NMMO recovery process, the PEO component does not interfere with the purification and recovery of the NMMO. In this respect, the PEO is removed by contact with the anion exchanger even though the PEO is itself nonionic. One possible explanation for this is because the regularity of the oxygen in the PEO chain provides the PEO polymer with an electron rich environment that is attracted to the positively charged anion exchange column. Also, there potentially is a mass capture affect which removes the PEO due to the relatively minute amount of PEO relative to the huge surface area of the anion exchanger.

Accordingly, it should be appreciated that the present invention accomplishes its intended objects in providing a process for regenerating a seamless cellulose tube from a nonderivatized cellulose solution wherein the extruded tube is expanded and passed over a sizing mandrel and cellulose regeneration at the extruded tube inner surface is accelerated without causing the binding of the extruded tube to the mandrel. This is accomplished by introducing a solution of water and PEO into the interior of the extruded tube. Moreover, in accordance with the present invention, the purification and recovery of NMMO solvent from the regenerating liquids for reuse is not compromised by the PEO.

Having thus described the invention in detail, what is claimed as new is:

1. A process for forming a seamless tubular film of a nonderivatized cellulose comprising the steps of:
   (a) forming a thermoplastic solution composed of nonderivatized cellulose, NMMO and water;
   (b) extruding the solution through an extrusion die having an annular extrusion orifice to form an extruded tube of the solution;
   (c) passing the extruded tube over and about a mandrel which depends from the die, the mandrel having a portion which defines a cylindrical surface which is larger in diameter than the extruded tube for contacting and diametrically expanding the extruded tube and thereafter passing the extruded tube into an outer bath comprising a nonsolvent liquid;
   (d) contacting the extruded tube with the outer bath for regenerating the cellulose to form a tube composed of a hydrated cellulose gel by extracting NMMO from the extruded tube;
   (e) introducing a NMMO-free nonsolvent liquid comprising water and PEO into the interior of the extruded tube to form a pool within the extruded tube and about the mandrel cylindrical surface, the pool contacting the inner surface of the extruded tube for initiating the extraction of NMMO from the inner surface of the extruded tube so as to commence the regeneration of cellulose at said inner surface;
   (f) passing the nonsolvent liquid and extracted NMMO downwardly from the pool between the inner surface of the extruded tube and the mandrel cylindrical surface and into an inner bath contained inside the tube of hydrated cellulose gel and below the mandrel nonsolvent liquid providing lubrication of the mandrel cylindrical surface to facilitate passage of the extruded tube over the mandrel cylindrical surface
   (g) removing and combining portions of the inner and outer baths to form a mixture of water, NMMO extracted from the extruded tube and PEO;
   (h) contacting the mixture with an anion exchange resin for removing the PEO to provide a PEO-free solution of water and NMMO; and
   (i) evaporating water from the PEO-free solution to concentrate the NMMO and using the concentrated NMMO in said step (a) of forming the thermoplastic solution.

2. A method as in claim 1 wherein the PEO has a molecular weight of 70,000 to 5,000,000.

3. A method as in claim 2 wherein the PEO has a molecular weight of 300,000.

4. A method as in claim 2 wherein the nonsolvent liquid introduced into the interior of the extruded tube is an NMMO-free aqueous solution comprising 0.01% of PEO having a molecular weight of 300,000.

5. A method as in claim 1 comprising contacting the PEO-free solution of water and NMMO with a cation exchanger prior to evaporating water therefrom.

6. A method as in claim 1 including:
   (a) washing the tube of hydrated cellulose gel to remove retained NMMO and obtain an NMMO-rich rinse water; and
   (b) combining at least a portion of the NMMO-rich rinse water with portions of the inner and outer baths to form said mixture.

7. A method as in claim 6 wherein said washing comprises passing said tube of hydrated gel counter current to a water flow.

8. A method as in claim 1 wherein said outer bath of nonsolvent liquid comprises an aqueous solution of 10% to 30% NMMO.

9. In a method for extruding a tube composed of a solution of nonderivatized cellulose, NMMO cellulose solvent and water about a mandrel having a mandrel portion larger than the extruded diameter of said tube, the improvement comprising:
   (a) introducing into the extruded tube a nonsolvent liquid consisting essentially of an aqueous PEO solution, said aqueous PEO solution providing for:
      (i) extracting NMMO solvent from the inner surface of the extruded tube wherein the extracted NMMO mixes with the nonsolvent liquid and
      (ii) lubrication the interface between the mandrel and the extruded tube to permit the passage of the extruded tube over the mandrel portion of the larger diameter
   (b) recovering at least part of the mixture of nonsolvent liquid and extracted NMMO;
   (c) passing the mixture through an anion exchanger for removing the PEO in the mixture to form a PEO-free NMMO aqueous solution;
   (d) evaporating water from the PEO-free NMMO aqueous solution to form a concentrated NMMO aqueous solution; and
   (e) employing the concentrated NMMO aqueous solution to form the extrudable solution of nonderivatized cellulose, NMMO cellulose solvent and water.

10. A method as in claim 9 wherein the PEO comprises about 0.01% of the aqueous PEO solution.

* * * * *